United States Patent
Chen et al.

(10) Patent No.: US 9,700,875 B2
(45) Date of Patent: Jul. 11, 2017

(54) MAGNETIC CATALYST FOR WET OXIDATION OF ORGANIC WASTE AND PREPARATION METHOD THEREOF

(71) Applicant: ATOMIC ENERGY COUNCIL-INSTITUTE OF NUCLEAR ENERGY RESEARCH, Taoyuan County (TW)

(72) Inventors: Yih-Ping Chen, Taoyuan County (TW); Chao-Rui Chen, Taoyuan County (TW); Yin-Mao Hsu, Taoyuan County (TW)

(73) Assignee: Atomic Energy Council—Institute of Nuclear Energy Research, Taoyuan County (TW)

( * ) Notice: Subject to any disclaimer, the term of this patent is extended or adjusted under 35 U.S.C. 154(b) by 606 days.

(21) Appl. No.: 14/025,065

(22) Filed: Sep. 12, 2013

(65) Prior Publication Data
US 2015/0069286 A1     Mar. 12, 2015

(51) Int. Cl.
  *B01J 21/00*     (2006.01)
  *B01J 23/83*     (2006.01)
  *B01J 37/03*     (2006.01)
  *B01J 35/00*     (2006.01)

(52) U.S. Cl.
  CPC ......... *B01J 23/83* (2013.01); *B01J 35/0033* (2013.01); *B01J 37/031* (2013.01)

(58) Field of Classification Search
  None
  See application file for complete search history.

(56) References Cited

U.S. PATENT DOCUMENTS

| 4,144,198 A * | 3/1979 | Miya ............ B01J 23/745 502/331 |
| 2007/0167657 A1* | 7/2007 | Kauffman ........ B01J 23/002 568/477 |
| 2008/0193760 A1* | 8/2008 | Rhee ............ B82Y 30/00 428/402 |
| 2009/0152500 A1* | 6/2009 | Chen ............ B01J 23/002 252/373 |

* cited by examiner

*Primary Examiner* — Anita Nassiri Motlagh
(74) *Attorney, Agent, or Firm* — Rosenberg, Klein & Lee

(57) ABSTRACT

The present invention relates generally to a magnetic catalyst for wet oxidation of organic waste and the preparation method thereof. According to the present invention, after the raw materials are dissolved and mixed in water, the pH value is adjusted for producing precipitates. Then after heating, filtering, drying, grinding, sifting, and calcinations are performed, the given magnetic catalyst can be reused without losing its activity. In addition, during treating organic waste by using wet oxidation method, no secondary waste is produced. Besides, the magnetic catalyst can be recycled by magnetic devices, making it excellent in terms of performance and convenience.

6 Claims, 1 Drawing Sheet

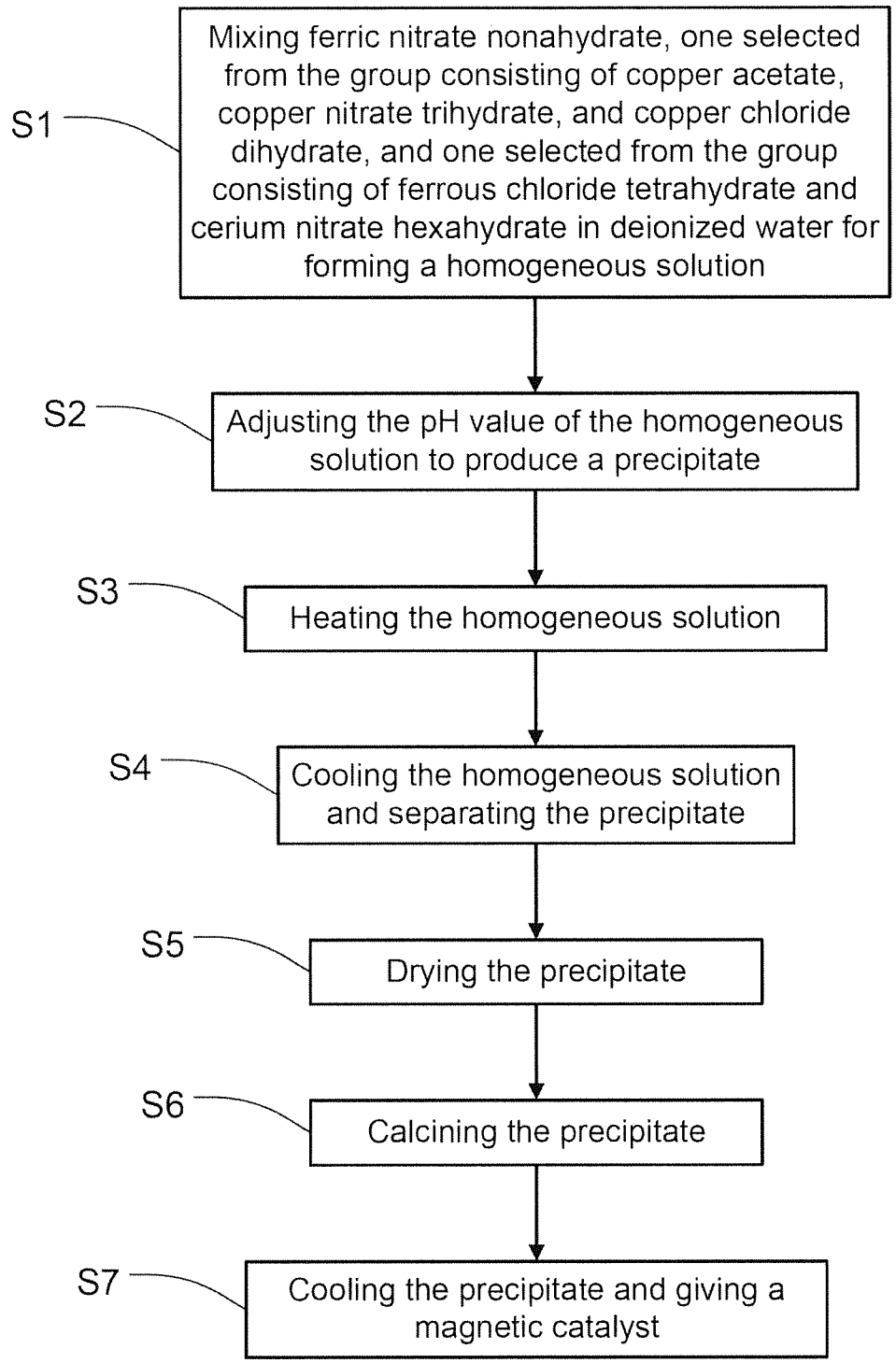

MAGNETIC CATALYST FOR WET OXIDATION OF ORGANIC WASTE AND PREPARATION METHOD THEREOF

FIELD OF THE INVENTION

The present invention relates generally to a magnetic catalyst and the preparation method thereof, and particularly to a magnetic catalyst and the preparation method thereof applied to wet oxidation of organic waste of various types.

BACKGROUND OF THE INVENTION

Thanks to the advantage of low costs and readily accessible in application, organic solvents and compounds are commonly used in an array of processes in various fields, including petrifaction, dyeing and finishing, semiconductor, and nuclear industries. However, it is inevitably to leave behind secondary waste such as organic wastewater, spent ion exchange resin. The organic waste needs to be further treated to meet the requirements of regulations for environmental protection before discharged so that it will not pose a threat to the surroundings.

A host of technologies for the treatment of organic waste have been developed and proposed worldwide and some of them are even successfully applied commercially. Some approaches employ extraction to separate organic components from original wastewater for reusing. Other processes decompose the organic components in the waste via addition of oxidants or degrade organic parts more efficiently by means of advanced oxidation. Still others destroy organic waste thoroughly via incineration and pyrolysis. Nonetheless, addition of extra oxidants is inherently to generate secondary waste. Besides, the oxidation efficiency declines substantially when the composition of waste is complex. In the case of advanced oxidization methods such as Fenton reaction, the catalyst—ferrous ion is likely to be consumed and cannot be recycled in each batch of reactions. Moreover, ferric hydroxide precipitates out and additional separation devices are required when the solution is alkaline. On the other hand, if incineration or pyrolysis is employed to treat organic waste, auxiliary fuel should be added because of insufficient calorific value. Moreover, the operation and maintenance costs are high. Thereby, the treatment of organic waste demands a better option.

In order to address the problems suffered in the above methods, a unique magnetic catalyst is developed for the treatment of organic waste in the Fenton reaction. In addition to the efficiency of decomposing organic waste comparable to that of Fenton reaction according to the prior art, the catalyst can also be readily recycled and no secondary waste in existence in the process.

The Fenton reaction is the process of mixing hydrogen peroxide with ferrous ions under acid conditions. It produces hydroxyl radicals (.OH) with strong oxidizing ability, which can further oxidize organic compounds. According to the Taiwan patent publication number I262174, ferrous ions in aqueous solutions are used as the catalyst for oxidation reaction to decompose the organic compounds in water. Nonetheless, in the reaction, the ferrous ions are prone to transform into ferric ions, which tend to form ferric hydroxide that readily precipitates out in neutral or alkaline environment. Accordingly, not only does secondary waste need to be dealt with, the treatment costs also increase as well.

Furthermore, as disclosed in the Taiwan patent publication number 309506, metal iron at the anode of an electrolytic/oxidizing reactor is oxidized while ferrous ions form at the cathode. Then add hydrogen peroxide for oxidizing the organic components in wastewater to decrease the level of chemical oxygen demand (COD) and avoid secondary waste coming from slurry of iron. Nonetheless, this technology only gears toward the treatment of organic wastewater with COD less than 1000 mg/L. Besides, extra electrolytic devices are required and the establishment of the system appears to be demanding. The capital and maintenance costs also increase.

Moreover, Taiwan patent publication number 524779 illustrates a technology of chemical oxidizing treatment for wastewater to yield only minor sludge. The ferric salts produced from the Fenton reaction tend to settle on the surface of the substrate in a fluidized bed. Thereby, over a half amount of sludge can be avoided in the solution. Nonetheless, this method merely applies to the treatment of organic wastewater with total organic carbon (TOC) less than 100 mg/L. Besides, its TOC-removing efficiency is only about 50%. The process is not suitable for the treatment of wastewater with high concentration of organic compounds.

In addition, according to the advanced oxidation process of iron-series catalysts disclosed in the Taiwan patent publication number I355294, by using heterogeneous and homogeneous iron ion catalysts simultaneously, the formation of free radicals from ozone is enhanced and thus reducing the total concentration of organic carbon in solution. However, this system needs the application of both technologies of ozone and ultraviolet-ray oxidation. Extra devices such as ozone generator and ultraviolet-ray lamps are also required. The whole process comes with complex operating procedures and demands special skills to operate and maintain. Only cases for the treatment of organic wastewater with low concentration are available.

Accordingly, the present invention try to provide a catalyst that can be applied extensively for the treatment of various organic wastes in Fenton reaction.

SUMMARY

The present invention aims to provide a preparation method of uniform magnetic catalysts, which can be applied extensively to the treatment of organic waste with high TOC concentration under wet oxidation reaction.

Another objective of the present invention is to provide a preparation method of magnetic catalysts for wet oxidation of organic waste. While using the magnetic catalyst, opposed to using ferrous ions as the catalyst according to the prior art, the present invention will not produce secondary waste such as ferric hydroxide. Thereby, the costs of separating and treating secondary waste can be saved.

Still another objective of the present invention is to provide a preparation method of magnetic catalysts for wet oxidation of organic waste. The catalyst is magnetic. If equipped with proper magnetic devices, for example, magnets or electromagnets, they can be separated from reaction solution effectively. Because of the simple separation procedure, the operation costs also reduce.

A further objective of the present invention is to provide a preparation method of magnetic catalysts for wet oxidation of organic waste. The catalysts can be readily recycled, reused and sustain their activity without declining.

To achieve the objectives described above, the present invention discloses a preparation method of magnetic catalysts for wet oxidation of organic waste comprising the following steps. Mix ferric nitrate nonahydrate (Fe$(NO_3)_3 \cdot 9H_2O$), one selected from the group consisting of copper acetate (Cu$(CH_3COO)_2 \cdot H_2O$), copper nitrate trihydrate ($Cu(NO_3)_2 \cdot 3H_2O$), and copper chloride dihydrate ($CuCl_2 \cdot 2H_2O$), and one selected from the group consisting of ferrous chloride tetrahydrate ($FeCl_2 \cdot 4H_2O$) and cerium nitrate hexahydrate ($Ce(NO_3)_3 \cdot 6H_2O$) in deionized water thoroughly to reach homogeneous state; adjust the pH value of the homogeneous solution to produce a precipitate; heat the homogeneous solution; cool the homogeneous solution; filter and collect the precipitate; dry the precipitate; calcine the precipitate; and cool the precipitate and a magnetic catalyst forms. By using the recipe and its relevant procedures, a magnetic catalyst for wet oxidation of organic waste with excellent treatment performance is given.

BRIEF DESCRIPTION OF THE DRAWINGS

The FIGURE shows the flowchart according to the present invention.

DETAILED DESCRIPTION

In order to manifest the effectiveness of the present invention, the detailed description of the present invention is provided as follows along with embodiments and accompanying FIGURE.

The FIGURE shows the flowchart according to the present invention. As shown in the FIGURE, the present comprises the following steps:

Step S1: Mixing ferric nitrate nonahydrate, one selected from the group consisting of copper acetate, copper nitrate trihydrate, and copper chloride dihydrate, and one selected from the group consisting of ferrous chloride tetrahydrate and cerium nitrate hexahydrate in deionized water for forming a homogeneous solution;

Step S2: Adjusting the pH value of the homogeneous solution to produce a precipitate;

Step S3: Heating the homogeneous solution;

Step S4: Cooling the homogeneous solution and separating the precipitate;

Step S5: Drying the precipitate;

Step S6: Calcining the precipitate; and

Step S7: Cooling the precipitate and giving a magnetic catalyst.

The step S1 described above is the step for formulating and mixing raw materials. Copper acetate, ferric nitrate nonahydrate, ferrous chloride tetrahydrate, and cerium nitrate hexahydrate with specific weight percentages are mixed in deionized water. Alternatively, only ferrous chloride tetrahydrate or cerium nitrate hexahydrate is used. In addition, copper acetate can be replaced by copper nitrate trihydrate or copper chloride dihydrate.

In the materials described above, the ratio of various ingredients has a great influence on the efficiency of the magnetic catalyst. A preferred formulation ratio is to mix 35~40% of ferric nitrate nonahydrate, 25~30% of copper acetate, 5~10% of ferrous chloride tetrahydrate, and 20~25% of cerium nitrate hexahydrate in weight percentages.

After adding the above materials in deionized water, stir thoroughly to make them dissolved in the water completely to get the homogeneous solution.

Then, in the step S2, the pH value of the homogeneous solution is adjusted. According to the present invention, sodium hydroxide (NaOH) is added slowly into the homogeneous solution to raise its pH value to the range between 9 and 11. Thereby, a precipitate will be produced. A preferred embodiment is to adjust the pH value to 10.

After adjusting the pH value and producing the precipitate, the precipitate is screened by a centrifuge or filter paper. After being flushed via deionized water for several times, the precipitate is placed in an oven for drying. The temperature of the oven is maintained between 100 and 120° C. A preferred embodiment is 115° C.

The desiccated precipitate is further ground and sifted. According to the present invention, the diameter of the precipitate has to be smaller than 150 micrometers (μm). By doing so, the surface areas are so sufficient that they can contribute to better performance.

Afterwards, the ground and screened precipitate is put into calcination. In general, substances will experience physical and chemical changes in the calcination process. Most of volatile impurities can be eliminated. The lattice structure of the substance may also alter. According to the present invention, the precipitate described above is placed in a furnace for an 800~900° C. calcination process for several hours. A preferred embodiment is maintained at the temperature of 850° C. for three hours.

Finally, the precipitate is cooled to room temperatures to give the magnetic catalyst according to the present invention. The mole percentages of the ingredients include 15~20% copper, 15~20% iron, 5~10% cerium, and 55~65% oxygen.

The prepared magnetic catalyst via the steps described above according to the present invention is used in the process of wet oxidation reactions for degrading organic waste. Take the liquid organic waste (10% methanol aqueous solution) for tests. At a fixed reaction temperature, the control variables include the total amount of 50% hydrogen peroxide (50, 60, 80 mL), the flow rate of the added 50% hydrogen peroxide (2.5, 5.0 mL/min), the added amount of the magnetic catalyst (1, 2 g), and the reaction time (60, 120 min). The destruction and removal efficiency of total organic carbon (TOC) for the above experiments is gauged.

The oxidant adopted in the wet oxidation experiment is 50% hydrogen peroxide aqueous solution pumped by a peristaltic pump at a fixed flow rate. The liquid organic waste 100 mL and a certain amount of the catalyst are placed first in the reaction chamber equipped with a condenser. A temperature sensor is inserted in the reactor for controlling temperatures. The reaction temperatures are controlled between 95 and 100° C. The stirring speed is set at 600 rpm. The reactor is immersed in a water bath well heated. After the reaction, the catalyst can readily be separated from the reaction solution via a magnetic rod.

Wet oxidation test is further performed on radioactive liquid organic waste for examining the reaction performance of the magnetic catalyst according to the present invention. Besides, the reusable performance of the catalyst is tested as well.

In order to quantify the destruction efficiency of TOC in liquid organic waste, the destruction and removal efficiency (DRE) is defined according to Equation 1 below. Because the final volume of the sample after each experiment cannot be controlled identical, the final volume of the sample is measured and multiplied by the concentration of the sample to give the total mass of TOC. Then, the variation of after and before reaction in mass of TOC is used for calculating the DRE.

$$DRE(\%) = (TOC_i - TOC)/TOC_i \times 100\% \quad \text{(Equation 1)}$$

where TOC: the mass of TOC in solution after reaction; $TOC_i$: the mass of TOC in solution before reaction.

In the following, the experimental results and the activity tests of the magnetic catalyst prepared according to the present invention on degrading liquid organic waste are listed. The types of the organic waste treated by the present invention are not limited to liquid form. Solid form such as spent ion exchange resin is also included.

Embodiment 1

Use about 10% methanol aqueous solution as the organic waste liquid (the initial TOC mass is 2968.2 mg). The experimental results of the amount of hydrogen peroxide used (Run 1、2、3), the adding flow rate of hydrogen peroxide (Run 3、5), the amount of the magnetic catalyst added (Run 3、6、7), and the total reaction time (Run 3、4) on the DRE are shown in Table 1. According to the experimental data, increasing the total amount of 50% hydrogen peroxide used in the reaction increases the DRE. In the process of Run 3, DRE can reach 99.97%. The concentration of total organic carbon in the solution after reaction is only 6.9 mg/L; its TOC mass is only 0.9 mg. In the cases of Run 3 and Run 5, the DRE can reach over 99% when the volume flow rates of the added hydrogen peroxide are 2.5 mL/min and 5.0 mL/min, respectively. According to the present embodiment, the effect of the amount of the magnetic catalyst added in the reaction on the DRE is also examined. The results show that without the magnetic catalyst (Run 7), the DRE is less than 50%. 1 g of the magnetic catalyst added is so sufficient that it makes the DRE greater than 99%. It proves that the magnetic catalyst has excellent performance according to the present invention. As for the reaction time, after reacting for 60 minutes, the DRE is only about 80%; it appears that the TOC is not totally decomposed. After reacting for 120 minutes, the TOC can be almost removed completely with the DRE reaching almost 100%.

TABLE 1

| Run | 50% $H_2O_2$ (mL) | Flow rate (mL/min) | Catalyst (g) | Time (min) | $C_{TOC}$ (mg/L) | $W_{TOC}$ (mg) | DRE (%) |
| --- | --- | --- | --- | --- | --- | --- | --- |
| 1 | 50 | 2.5 | 2 | 120 | 5770 | 640.5 | 78.42 |
| 2 | 60 | 2.5 | 2 | 120 | 1370 | 172.6 | 94.18 |
| 3 | 80 | 2.5 | 2 | 120 | 6.9 | 0.9 | 99.97 |
| 4 | 80 | 2.5 | 2 | 60 | 3535 | 576.2 | 80.59 |
| 5 | 80 | 5.0 | 2 | 120 | 41.6 | 6.4 | 99.78 |
| 6 | 80 | 2.5 | 1 | 120 | 43.6 | 5.8 | 99.80 |
| 7 | 80 | 2.5 | 0 | 120 | 8630 | 1501.6 | 49.41 |

Organic waste liquid: 10% MeOH, 100 mL, initial TOC=29,682 mg/L;
Reaction temperature: 95~100° C.

Embodiment 2

Another feature of the magnetic catalyst according to the present invention is that it can be repeatedly applied to wet oxidation reaction without activity decay. Thereby, the performance of repeated usage of the magnetic catalyst according to the present invention is also tested, as shown in Table 2. After 11 times of continual tests, the DRE can all reach above 99.9%. The result proves that the magnetic catalyst prepared according to the present invention can be reused effectively.

TABLE 2

| Run | $C_{TOC}$ (mg/L) | $W_{TOC}$ (mg) | DRE (%) |
| --- | --- | --- | --- |
| 1st | 8.29 | 1.33 | 99.96 |
| 2nd | 8.70 | 1.40 | 99.95 |
| 3rd | 8.25 | 1.33 | 99.96 |
| 4th | 7.34 | 1.24 | 99.96 |
| 5th | 7.96 | 1.27 | 99.96 |
| 6th | 8.62 | 1.39 | 99.95 |
| 7th | 8.40 | 1.37 | 99.95 |
| 8th | 7.30 | 1.18 | 99.96 |
| 9th | 8.31 | 1.34 | 99.95 |
| 10th | 7.97 | 1.38 | 99.95 |
| 11th | 7.66 | 1.37 | 99.95 |

Organic waste liquid: 10% MeOH, 100 mL, initial TOC=29,682 mg/L;
Oxidant: 50% $H_2O_2$, 80 mL, 2.5 mL/min;
Catalyst: Magnetic catalyst, 2 g;
Reaction temperature: 95~100° C.;
Reaction time: 120 min.

Embodiment 3

According to the present invention, experiments have been conducted for treating organic liquid radioactive waste by wet oxidation reaction (TOC concentration is 25,000 mg/L), as shown in Table 3. After reacting for 120 minutes, the DRE can reach 98%. Compared with the conventional Fenton reaction using ferrous ion aqueous solution, there is no precipitate of ferric hydroxide produced in the reaction. By using the magnetic catalyst prepared according to the present invention in wet oxidation reaction, organic liquid radioactive waste can be treated effectively and the secondary waste such as precipitates of ferric hydroxide can be eliminated. In addition, the magnetic devices can be used for separating the catalyst from the reaction solution quite easily.

TABLE 3

| Exp. | MOC Catalyst (g) | 50% $H_2O_2$ (mL) | Time (min) | TOC (mg/L) | DRE (%) |
| --- | --- | --- | --- | --- | --- |
| Heterogeneous Catalyst | 2.0 | 80 | 60 | 3230 | 87.08 |
|  |  |  | 120 | 481 | 98.08 |

By employing the steps described above, a magnetic catalyst is prepared according to the present invention for treating organic waste by wet oxidation reaction. Not only can the process degrade organic wastewater with high TOC concentration, it is also effective for decomposing the spent ion exchange resin. Besides, it does not generate secondary waste such as solid precipitates of ferric hydroxide, and thus saving the costs of the treatment of secondary waste. Furthermore, when combined with proper magnetic devices such as electromagnets, the solid catalysts can be separated from the reaction solution effectively. That simplifies the separation procedures as well as reduces the operation costs. Moreover, the magnetic catalyst can be recycled and reused. After multiple times of usage, the magnetic catalyst is still effective without activity decay. Thereby, the present invention undoubtedly provides a unique magnetic catalyst for wet oxidation of organic waste and the preparation method thereof.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A preparation method of a magnetic catalyst for wet oxidation of organic waste, comprising steps of:

mixing ferric nitrate nonahydrate ($Fe(NO_3)_3 \cdot 9H_2O$), ferrous chloride tetrahydrate ($FeCl_2 \cdot 4H_2O$), cerium nitrate hexahydrate ($Ce(NO_3)_3 \cdot 6H_2O$) and one selected from the group consisting of copper acetate ($Cu(CH_3COO)_2 \cdot H_2O$), copper nitrate trihydrate ($Cu(NO_3)_2 \cdot 3H_2O$), and copper chloride dihydrate ($CuCl_2 \cdot 2H_2O$) in deionized water for forming a homogeneous solution;

adjusting the pH value of said homogeneous solution to produce a precipitate;

heating said homogeneous solution;

cooling said homogeneous solution and separating said precipitate;

drying said precipitate;

calcining said precipitate; and cooling said precipitate and giving a magnetic catalyst;

where said magnetic catalyst is added to an organic waste in a wet oxidation reaction, and a magnetic device is used for separating said magnetic catalyst after said wet oxidation reaction ends.

2. The preparation method of claim 1, wherein sodium hydroxide is added to said homogeneous solution in said step of adjusting the pH value of said homogeneous solution.

3. The preparation method of claim 2, wherein said sodium hydroxide is added to said homogeneous solution until the pH value is between 9 to 11.

4. The preparation method of claim 1, wherein said homogeneous solution is heated to 90~100° C. for two hours in said step of heating said homogeneous solution.

5. The preparation method of claim 1, wherein said precipitate is further ground and sifted to make the diameter of said precipitate smaller than 150 micrometers in said step of drying said precipitate.

6. The preparation method of claim 1, wherein said precipitate is heated to 800~900° C. for three hours in said step of calcining said precipitate.

* * * * *